US009195558B2

(12) United States Patent
Focazio et al.

(10) Patent No.: US 9,195,558 B2
(45) Date of Patent: Nov. 24, 2015

(54) PILOTING IN SERVICE DELIVERY

(71) Applicant: International Business Machines Corporation, Armonk, NY (US)

(72) Inventors: Robyn L. Focazio, Round Rock, TX (US); Yefim H. Michlin, Haifa (IL); Larisa Shwartz, Scarsdale, NY (US); Maheswaran Surendra, Croton-on-Hudson, NY (US)

(73) Assignees: INTERNATIONAL BUSINESS MACHINES CORPORATION, Armonk, NY (US); TECHNION RESEARCH AND DEVELOPMENT FOUNDATION LIMITED, Haifa (IL)

( * ) Notice: Subject to any disclaimer, the term of this patent is extended or adjusted under 35 U.S.C. 154(b) by 185 days.

(21) Appl. No.: 13/902,804

(22) Filed: May 25, 2013

(65) Prior Publication Data

US 2014/0351651 A1 Nov. 27, 2014

(51) Int. Cl.
*G06F 11/00* (2006.01)
*G06F 11/26* (2006.01)
*G06F 17/18* (2006.01)
*G06F 11/36* (2006.01)
*G06Q 10/00* (2012.01)

(52) U.S. Cl.
CPC .............. *G06F 11/261* (2013.01); *G06F 17/18* (2013.01); *G06F 11/3672* (2013.01); *G06Q 10/00* (2013.01)

(58) Field of Classification Search
CPC ............ G06F 11/1476; G06F 11/2263; G06F 11/261; G06F 17/18
See application file for complete search history.

(56) References Cited

U.S. PATENT DOCUMENTS

| 6,038,517 | A  | * | 3/2000  | Dobbins et al. ................. 702/82 |
| 7,155,365 | B1 | * | 12/2006 | Gross et al. .................. 702/179 |
| 7,171,586 | B1 | * | 1/2007  | Gross et al. ................... 714/26 |
| 8,374,822 | B2 |   | 2/2013  | Grabarnik |
| 2010/0292959 | A1 | * | 11/2010 | Gross et al. .................. 702/181 |
| 2011/0119030 | A1 | * | 5/2011  | Grabarnik et al. ............ 702/181 |
| 2013/0030779 | A1 |   | 1/2013  | Leonard |

FOREIGN PATENT DOCUMENTS

| EP | 1796270 | 6/2007 |
| WO | WO 02063510 | 8/2002 |

OTHER PUBLICATIONS

U. Narayan Bhat and S. Subba Rao; "Statistical Analysis of Queueing Systems;" Mar. 1987; vol. 1, Issue 3; pp. 217-247.*

Genady Ya. Grabarnik, Yefim Haim Michlin, and Larisa Shwartz; "Designing Pilot for Operational Innovation in IT Service Delivery;" Network Operations and Management Symposium (NOMS), 2012 IEEE; Apr. 16-20, 2012 (Date of Conference); pp. 1343-1351.*

(Continued)

*Primary Examiner* — Joseph Kudirka
(74) *Attorney, Agent, or Firm* — Louis J. Percello; Otterstedt, Ellenbogen & Kammer, LLP

(57) ABSTRACT

A method for comparing systems includes running, simultaneously, a first system and a second system, wherein the first system and the second system process events, collecting first data from the first system based on the processing of the events, collecting second data from the second system based on the processing of the events, wherein the second system includes at least one feature different than the first system, and performing a sequential probability ratio test based on the first data and the second data.

15 Claims, 6 Drawing Sheets

(56) References Cited

OTHER PUBLICATIONS

Y. H. Michlin, and R. Migdali, "Test duration in choice of helicopter maintenance policy." Reliability Engineering & System Safety, 86.3, Dec. 2004: 317-321.

E. Gordienko, A. Novikov, and E. Zaitseva, "Stability estimating in optimal sequential hypotheses testing", Kybernetika, 45(2), Apr. 2009, pp. 331-344.

A. Kharin, and Kishylau, D. "Robust Sequential testing of hypotheses on discrete probability distributions". Austrian journal of statistics, V. 34, No. 2, 2005, 153-162.

A. Chaturvedi, N. Tiwari, and S. K. Tomer, "Robustness of the sequential testing procedures for the generalized life distributions," Brazilian Journal of Probability and Statistics, 16, Jan. 2002: 7-24.

N. Gans, G. Koole, and A. Mandelbaum. "Telephone call centers: Tutorial, review, and research prospects." Manufacturing & Service Operations Management 5, No. 2 (Mar. 2003): 79-141.

M. Hollander and F. Proschan, "Testing whether new is better than used," The Annals of Mathematical Statistics, vol. 43, No. 4, pp. 1136-1146, Apr. 1972.

Y. H. Michlin1, G. Grabarnik2. "Comparison Sequential Testing for Reliability: Exact Computation of OC and ASN" Proceedings of the 5th International Conference RelStat Oct. 2005, vol. 7, No. 2, 2006, pp. 295-303.

Yefim Haim Michlin and Genady Grabarnik (2011). "Comparison Sequential Test for Mean Times Between Failures", Modern Approaches to Quality Control, Dr. Ahmed Badr Eldin (Ed.), Nov. 2011, pp. 453-476, http://cdn.intechopen.com/pdfs/22149/InTech-Comparison_sequential_test_for_mean_times_between_failures.pdf.

* cited by examiner

PILOTING IN SERVICE DELIVERY

BACKGROUND

The present disclosure relates to testing system and processes, and more particularly to evaluating a change to a production system or process thereof.

In an increasingly complex and specialized world, human expertise about diverse subjects spanning scientific, economic, social, and political issues plays an important role in the functioning of organizations. In this context, Information Technology (IT) tools have become indispensable to many organizations that rely on human experts' ability to identify and synthesize diverse factors, form judgments, evaluate alternatives, and make decisions.

The variability and volatility of IT services makes it difficult to predict the value of a change in a system or process, whether prior to deployment or once deployed in a production environment. Piloting or direct experimentation is used for introducing operational innovations into a service delivery process or method. Well-designed piloting can reduce the effect of interpretive lenses through which the service business views the change. Piloting enables a business to determine how an operational change performs in the production environment and aids in assessment of the change's potential benefit.

BRIEF SUMMARY

According to an exemplary embodiment of the present disclosure, a method for determining piloting a first system includes receiving a first hypothesis, receiving first test parameters of a decision state space defined on a sequential probability ratio test plot of a number of failures of the first system versus a number of failures of a reference system, identifying for a arbitrary distribution of events, a first number of events to be processed by the first system and the reference system that will satisfy the first test parameters, determining a coefficient of variation of the arbitrary distribution of events, and determining whether to perform the sequential probability ratio test plot using the arbitrary distribution of events or historical data based on the coefficient of variation.

According to an exemplary embodiment of the present disclosure, a method for comparing systems includes running, simultaneously, a first system and a second system, wherein the first system and the second system process events, collecting first data from the first system based on the processing of the events, collecting second data from the second system based on the processing of the events, wherein the second system is includes at least one feature different than the first system, and performing a sequential probability ratio test based on the first data and the second data.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

Figure 1:
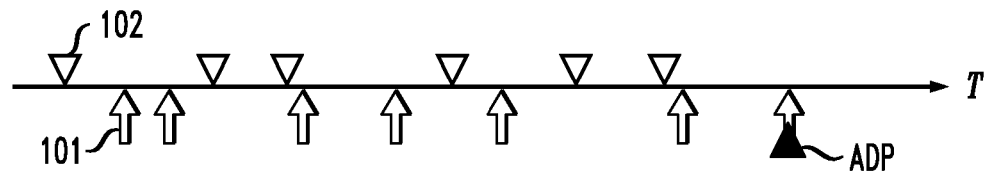
FIG. 1 shows a test scheme over time according to an exemplary embodiment of the present disclosure.

Embodiments of the present disclosure relate to a piloting methodology that supports a decision-making process of evaluating an Information Technology (IT) process or function (e.g., a request fulfillment process) relative to the business value it generates.

Embodiments of the present disclosure are described in the context of a dispatch system/service desk that receives service requests and creates corresponding tickets by routing the requests to support (e.g., a technician). A ticket in an IT setting may include a request for various computer related service tasks such as a request to update/install application software, backup a database/flat files, create a user account, add/replace memory, reset a password, reload an operating system, reboot a server, add disk space, troubleshoot a device (e.g., computer, printer, router, etc.), replace/add a device, etc.

In an exemplary environment, the dispatch system takes the requests (e.g., tasks) and routes the requests to support (e.g., the technician). Embodiments of the present disclosure can be applied to, for example, a method or system of routing. For example, a hardware component can be implemented in a pilot system replacing a manual routing method or replacing another piece of hardware providing routing. The pilot system can be compared against a reference system (e.g., a currently implemented system) to determine whether the pilot system represents an improvement over the reference system.

According to an exemplary embodiment of the present disclosure, a stable and robust pilot is described for non-exponential distributions of fulfillment times typical of service delivery along with methodologies for quantitative estimates. Further, a pilot's parameters can be set for various distributions of resolution times in the streams or processes under comparison. The parameters can be user defined variables for controlling what hypotheses are accepted, that is, defining what success means in the pilot.

The pilot system can further include functionality for determining a confidence level in the routing, wherein an automated routing can be automatically approved in a case of a high confidence and the routing can be sent to a reviewer for approval in a case of low confidence.

It should be understood that embodiments of the present disclosure are not limited to IT, as they can be applied to other fields where tasks are assigned to workers, or more generally where events are routed.

According to an exemplary embodiment of the present disclosure, a sequential comparison test or sequential probability ratio tests can be used as a direct tool for performance evaluation of operational innovation in volatile service delivery processes. Sequential comparison tests can be implemented for evaluating changes in systems or processes, and for statistical measurement of process parameters (e.g., to determine a confidence level in the evaluation). These tests are comparative (e.g., matching a first process against that of another process working in parallel and serving as the reference) and correct with regard to measurements under changing parameters (e.g., ensuring a robust piloting method).

According to an exemplary embodiment of the present disclosure, a sequential comparison test can be implemented to evaluate a change in a system or a process. Examples of the sequential comparison test include a Comparison Sequential Probability Ratio Test (CSPRT), a fixed sample size test (FSST) and the pairwise comparison SPRT (PCSPRT). While the CSPRT can be considered a preferred embodiment, each example is described herein.

The CSPRT procedure verifies a hypothesis $H_0$ about a ratio $\Phi$ of Mean Time Between Events (MTBE) $\theta$ for a new or pilot system (marked new) and a reference (marked ref) system:

$$\Phi = \theta_{ref}/\theta_{new} \quad (1)$$

$$H_0: \Phi \geq \Phi_0, P_a(\Phi_0) = 1-\alpha$$

$$H_1: \Phi < \Phi_0, P_a(\Phi_1) = \beta \quad (2)$$

where $P_a(\Phi)$—the acceptance probability of $H_0$ at given $\Phi$ (the OC of the test), and $$\Phi_1 = \Phi_0/D \quad (3)$$

where D is the discrimination ratio of the test; $\Phi_0$, D, $\alpha$, $\beta$—are fixed. Here, $\alpha$ and $\beta$ are different types of error and are described in more detail below.

During the CSPRT two compared systems are tested simultaneously (FIG. 1). When an event occurs, such as receiving a new request, within one of the systems, the system goes into an initial state. In the initial state, a decision is made either to stop the test, or to accept/reject the hypothesis $H_0$, or to continue the test until a next event.

Figure 2:
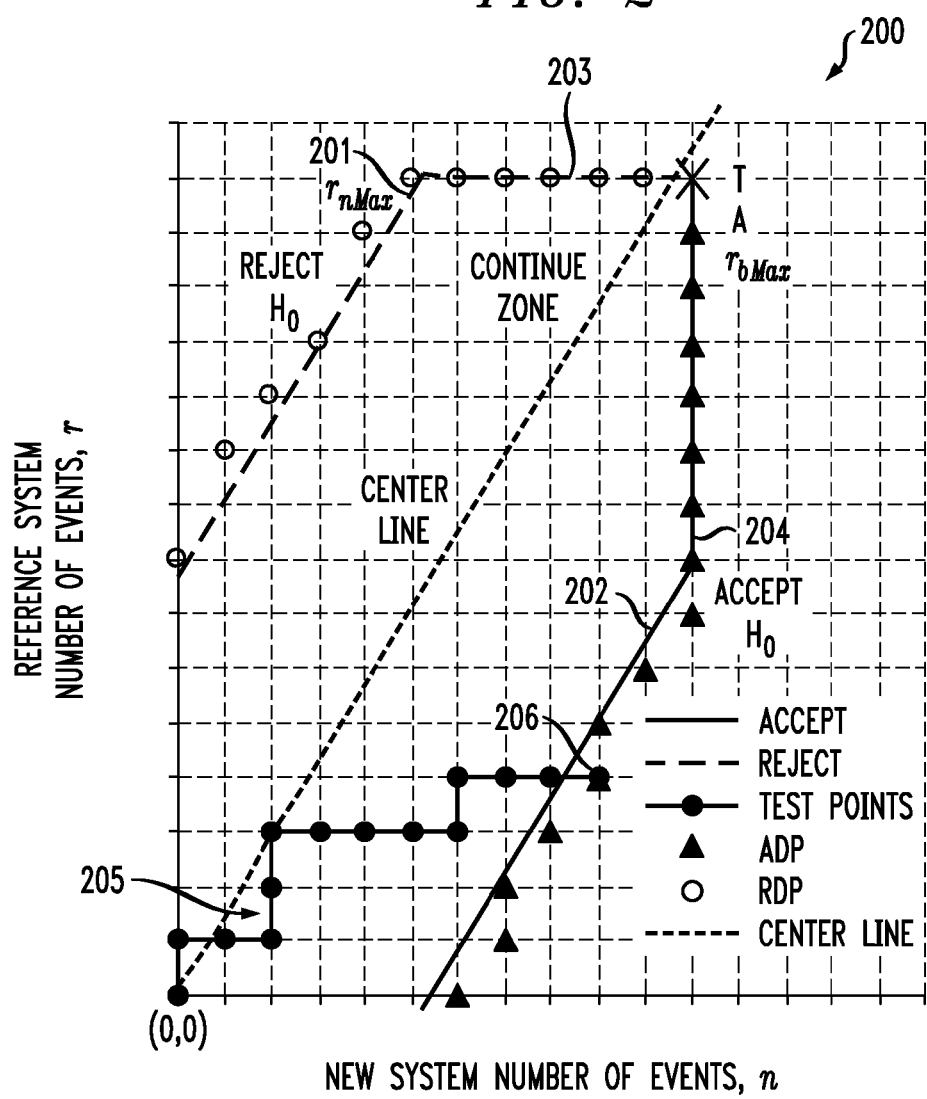
FIG. 2 shows a test plan according to an exemplary embodiment of the present disclosure.

In FIG. 1, a test course is shown in a time domain, wherein upward marks, e.g., 101, correspond to events of the reference system and downward marks, e.g., 102, correspond to events of the new system, where T is a time line common to both systems and ADP is an Accept Decision Point and stopping of the test (see FIG. 2).

In FIG. 2, a decision state space 200 of a test is represented as a random walk, with steps to the right or steps up in a plane. The decision state space 200 is presented in discrete coordinates (n, r), new and reference system number of events, respectively. A step up can be interpreted as a failure or an error of the new system and a step to the right can be interpreted as a failure or an error of the reference system.

The test stops when a test course 205 leaves the continue zone, such as at 206. The continue zone is an area around a continue line bounded by parallel oblique boundaries 201 and 202 and by truncation lines 203 and 204 parallel to the coordinate axes. Due to the statistical nature of the experiment, the result of a test is error-free in rare cases.

Consider the probabilities of two types of error: the first is that of rejecting a correct hypothesis (type 1 error, $\alpha$), and the second is that of accepting a false hypothesis (type 2 error, $\beta$). A discrimination ratio, which represents an ability of the experiment to differentiate between close values of parameters of the pilot and the reference systems, can be denoted as d.

Given the foregoing, FIG. 2 shows a truncated test plan and an example of a test course 205 in an events domain. Furthermore, FIG. 2 corresponds to the example in FIG. 1, with the test characteristics: $\alpha=0.2$, $\beta=0.1$, discrimination ratio D=3

In FIG. 2, the test begins at point (0,0) and with each event in either system. The test course moves one step to the right (reference system) or upward (new system). A hypothesis $H_0$ can be accepted when one of the lower or right-hand boundaries (202 or 204) is crossed at points denoted by ADP and can be rejected when one of the upper and left-hand boundaries (201 or 203) is crossed at RDP (Reject Decision Point).

For CSPRT with exponential TBE, the estimate of $\Phi$ is time-invariant and changes at the moment of an event with one of the systems. The probability that the next event will occur with the reference system can be written as:

$$P_R(\Phi) = 1/(1+\Phi). \quad (4)$$

The probability of an upward step, towards the reject boundary 201 irrespective of the point's coordinates, can be given by (4). This permits presentation of a test in binomial form and a reduction to the SPRT.

With the ADP and RDP given, the test characteristics (Operating Characteristic (OC) and the Average Sample Number (ASN)) can be obtained as follows.

The probability of hitting any point with coordinates (n, r) within the boundaries can be obtainable recursively as:

$$P(n,r) = P(n,r-1) \cdot P_R + P(n-1,r) \cdot (1-P_R). \quad (5)$$

The probability $P_a(\Phi)$ for given test boundaries can be the sum of those of hitting ADP:

$$P_a(\Phi) = \sum_r P_{ADP(r)}(\Phi) \quad (6)$$

where ADP(r) is the n coordinate of the ADP for given r, $P_{ADP(r)}(\Phi)$—the probability of hitting the above at given $\Phi$.

Accordingly, $\alpha_{real}$ and $\beta_{real}$ can be determined as:

$$\alpha_{real} = 1 - P_a(\Phi_0)$$

$$\beta_{real} = P_a(\Phi_1). \quad (7)$$

The test ASN can be determined as:

$$ASN(\Phi) = \quad (8)$$

$$\sum_n [RDP(n)+n] \cdot P_{RDP(n)}(\Phi) + \sum_r [ADP(r)+r] \cdot P_{ADP(r)}(\Phi).$$

The Average Test Duration (ATD) in terms of $\theta_{ref}$ can be given by:

$$ATD(\Phi) = \theta_{ref} \cdot ASN(\Phi)/(1+\Phi). \quad (9)$$

Using a methodology for a non-truncated binomial SPRT and established analytical expressions approximating OC and ASN.

Referring to the probability p of a move upward in the state space of the test in FIG. 2; the hypotheses in (2) can be given by:

$$H_0: p \le p_0, P_a(p_0) = 1 - \alpha$$

$$H_1: p > p_0, P_a(p_1) = \beta \quad (10)$$

where $$p_0 = P_R(\Phi_0); p_1 = p_0 d; d = 2D/(1+D). \quad (11)$$

For example, for D=2 and $\Phi_0$=1, using expressions (4) and (11), $p_0$=0.5, $p_1$=0.667, $d$=1.33.

The binomial form for the OC of this test can be given by the function $p_a(p)$ which has the parametric form:

$$P_a(\eta) = (A^\eta - 1)/(A^\eta - B^\eta) \quad (12)$$

$$p(\eta) = \left[1 - \left(\frac{1 - p_0 d}{1 - p_0}\right)^\eta\right] / \left[d^\eta - \left(\frac{1 - p_0 d}{1 - p_0}\right)^\eta\right] \quad (13)$$

where η—the construction parameter;

$$A = (1 - \beta_{real})/\alpha; B = \beta(1 - \alpha). \quad (14)$$

Similarly, ASN for a non-truncated test has a parametric form which can be denoted by $ASN_{nonTr}(p)$:

$$ASN_{nonTr}(\eta) = \frac{P_a(\eta) \cdot \ln B + (1 + P_a(\eta)) \cdot \ln A}{p(\eta) \cdot \ln d + (1 + p(\eta)) \ln((1 - p_0 d)/(1 - p_0))} \quad (15)$$

where p(η)—by (13).

In a case where the distribution of the TBEs is not exponential, the probability of an upward step depends on the path of the test prior to this step (see FIG. 2). The test is then no longer binomial and the above formulations (4)-(5) do not apply, hence the utility of a robustness check.

Referring now to a method for estimating the robustness of the CSPRT; the Monte Carlo method can be used to establish robustness of the CSRPT for non-exponential distributions of $TBE_{ref}$ and $TBE_{new}$. Herein, a CSPRT with known Accept and Reject lines is considered, with values determined for OC and ASN, for exponential TBEs. The obtained test is applied to the TBEs corresponding to a non-exponential distribution belonging to one of the frequently used families. Note that in the general case the probabilities $P_R$ of a step up depend on the time elapsed since the last steps up and to the right. Hence the test considered the whole set of TBEs. This can be achieved as follows.

A simulation can be implemented as shown in FIG. 1. The time intervals between the steps for the reference and new systems $TBE_{ref}$ and $TBE_{new}$ can be generated using given distributions. Moving from T=0 along the T-axis, each point representing an event in the reference system (upward marks, FIG. 1) matches an upward step in FIG. 2, and one representing an event in the new system (downward marks) matches a step to the right. The test continues until the Accept or Reject boundary is crossed. Once a boundary is crossed, the test can be stopped and a final point recorded.

The results from a large number of simulation runs yields the statistical probability and the characteristics (6)-(9) of the test.

Note that matrix capabilities of known numerical computing environments, such as MATLAB, can be used to reduce the computation time for a large number of runs (e.g., $10^5$) due to the parallel simulations. These tools can be used for high accuracy and smoothness in graphical representation of results.

Referring now to a pairwise comparison SPRT (PCSPRT); for the PCSPRT, each pair of compared systems can be tested until an event occurs in one of them. On that event, the test can be stopped and, after verifying hypothesis (2), a decision can be made on acceptance of $H_0$ or continuation of the test. In the case that the test continues, a new pair of systems can be selected.

According to an exemplary embodiment of the present disclosure, a memoryless test can be used when the underlying TBE distributions are exponential. Perturbed tests, or those with non-exponential TBE distributions, are dependent on the past, or for the binomial test on the path to the current state. The PCSPRT, due to the fact that both systems are renewed simultaneously, remains memoryless, which makes for simplified evaluation, dispensing with simulation over all possible paths to the current state.

Special feature of Sample Number (SN) concept for PCSPRT; for this test (as well as for the CSPRT) the SN represents the total number of events undergone by the compared systems. As in this case each event means renewal of both systems, the number of systems (IN) participating in the test is double the SN. (IN=2SN), and if the TBEs of the compared elements are exponentially distributed, the test is identical with the CSPRT.

Referring now to a method for estimating the robustness of the PCSPRT; when the above TBEs are non-exponential, formula (4) for $P_R$—probability of an upward step—does not hold. The upward step in question (see FIG. 2) is towards the Reject boundary, hence its probability is also that of the TBE for the reference system being less that for its new counterpart, and in the general case has the form:

$$p(\Phi) \equiv P_R(\Phi) = \int_0^\infty f_{ref}(t)[1 - F_{new}(t, \Phi)] dt \quad (16)$$

where $f_{ref}(t)$—probability density of TBE for reference system for given $\theta_{ref}$;

$F_{new}(t,\Phi)$—cumulative function of TBE for new system for given $\Phi$ and $\theta_{ref}$.

For a non-exponential distributions the test remains binomial, and formulae (5)-(8) remain valid for its characteristics.

Formulae (12)-(16) permit assessment of the influence of the TBEs on the test characteristics, using the following algorithm.

Calculation of the boundary parameters and characteristics of the PCSPRT for exponential TBEs of the compared systems and for given $\Phi_0$, D, α, β. In that case, calculation of $P_R(\Phi_0)$ as per (4) of A and B as per (14); of $p_0$, $p_1$ and d as per (11).

Calculation of the parameters and characteristics for non-exponential TBEs, as per (16), (12)-(15).

Comparison the $P_a(\Phi)$ and $ASN_{nonTr}(\Phi)$ obtained under (a) and (b), which will provide an indication of the test's robustness.

Referring to a comparison of a Fixed Sample Size Test (FSST); to check the hypotheses (2), a test can continue up to preset sample size (e.g., number of events), namely r and n for the reference and new systems respectively, not necessarily equal. When these sizes have been reached, a decision is taken on acceptance/rejection of the null hypothesis. The test is powerful for given sizes and can be used for a comparative assessment of test efficacy.

Denote by $T_{new}$ and $T_{ref}$ the total working times of the respective systems, up to stopping of the test. When the TBE distribution is exponential, $T_{ref}$ and $T_{new}$ have an $\chi^2$-distribution with 2r and 2n degrees of freedom respectively, and the $(T_{ref}/2r)/(T_{new}/2n)$ ratio obeys an F-distribution with the same degrees of freedom.

The null hypothesis (2) can be accepted when (17) is satisfied, and rejected in an opposite case:

$$F<c \qquad (17)$$

where $$F=(T_{ref}/2r)/(T_{new}/2n) \qquad (18)$$

c—critical value of the test statistic, $$c=\Phi_0 q_F(\alpha, 2r, 2n) \qquad (19)$$

$q_F(\alpha, 2r, 2n)$—quantile of F-distribution with 2r, and 2n degrees of freedom at probabilities $\alpha$.

The values of n and r can be obtained per:

$$D \cdot q_F(\alpha, 2r, 2n) = q_F(1-\beta, 2r, 2n). \qquad (20)$$

Here, a ratio can be set between n and r, e.g., on the basis of the expected rates of events arrived from the compared systems. If the rates are the close, it is reasonable to set n=r.

Referring to the robustness of the FSST evaluation; for $2r \to \infty$, the $\chi^2$-distribution tends to the normal and respectively $T_{ref}/2r$ tends to the normal with expectation 1 and standard deviation $(1/\sqrt{r})$ $$(T_{new}/2r) \sim N(1, 1/\sqrt{r}). \qquad (21)$$

The $\chi^2_{2r}$-distributed random value can be presented as the sum of 2r random values. It is usually accepted that for 2r>30 (r>15), the approach to the normal is sufficiently close.

For an exponential distribution, a coefficient of variation ($C_V$) is equal to 1. For other distributions, $C_V$ can differ from 1 and accordingly $$(T_{new}/2r) \sim N(1, C_V/\sqrt{r}) \equiv N(1, 1/\sqrt{r_{eff}})$$

where $r_{eff}$—the effective number of events $$r_{eff} = r/C_V^2. \qquad (22)$$

According to an exemplary embodiment of the present disclosure, the $C_V$ of incoming requests is a parameter that can be analyzed and taken into account prior to performing a comparison. That is, the $C_V$ can reveal a distribution of requests (e.g., the rate at which requests are received). The $C_V$ of the requests can affect the robustness of a test, and in some cases, the requests can be augmented with simulation data to ensure that a test is robust.

All the above holds for $T_{new}$ and $n_{eff}$, hence for (r>15)∩(n>15) the robustness of the FSST can be evaluated through $\alpha_{real}$ and $\beta_{real}$ as follows:

Determining r, n by (20) for specified $\alpha$, and $\beta$.
Determining $r_{eff}$, $n_{eff}$ by (21)-(22) for specified $C_V$.
Determining $\alpha_{real}$, and $\beta_{real}$ by (23) for the $r_{eff}$, $n_{eff}$, c found above.

$$\alpha_{real} = F_F(c/\Phi_0, 2r_{eff}, 2n_{eff}), \beta_{real} = 1 - F_F(c/\Phi_1, 2r_{eff}, 2n_{eff}) \qquad (23)$$

where $F_F(c/\Phi_0, 2r_{eff}, 2n_{eff})$—cumulative function of F-distribution with $2r_{eff}$ and $2n_{eff}$ degrees of freedom.

When $C_V<1$ for both input event streams, the degrees of freedom in (23) increase in accordance with (22) hence $\alpha_{real}$, and $\beta_{real}$ being less their nominal counterparts. In other words, the FSST is robust at $C_V \leq 1$ for both streams.

Above, the CSPRT has been evaluated based on simulation of the events with available life distributions including Weibull, gamma, lognormal, etc. In the case of a perturbed distribution of the TBE, the test result starts to depend on the time that event spent in the system, and the test is not memoryless. The Monte Carlo method can be used to simulate possible TBEs.

Note that for the Weibull and gamma distributions, the hazard function is monotonic. In this case the results are similar to those concerning robustness of non-comparison tests. For the lognormal distribution, the hazard function is not monotonic, and the methods are not applicable even in the case of non-comparison tests.

As noted above, $C_V$ can be implemented as an external factor of test robustness.

Figure 3:
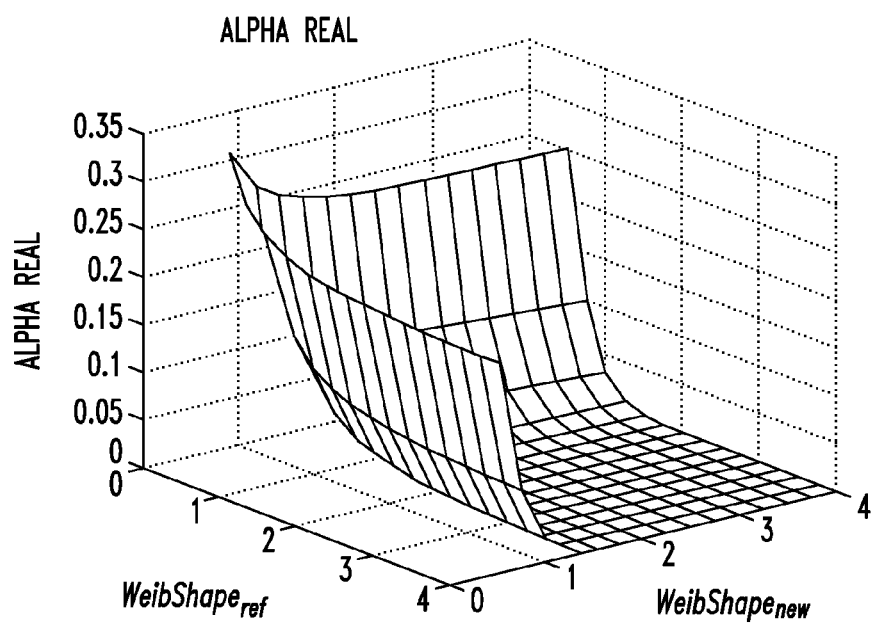
FIG. 3 shows a graph of deviations of a Time Between Events (TBE) distribution from an exponential and an affect on test characteristics according to an exemplary embodiment of the present disclosure.
Figure 4:
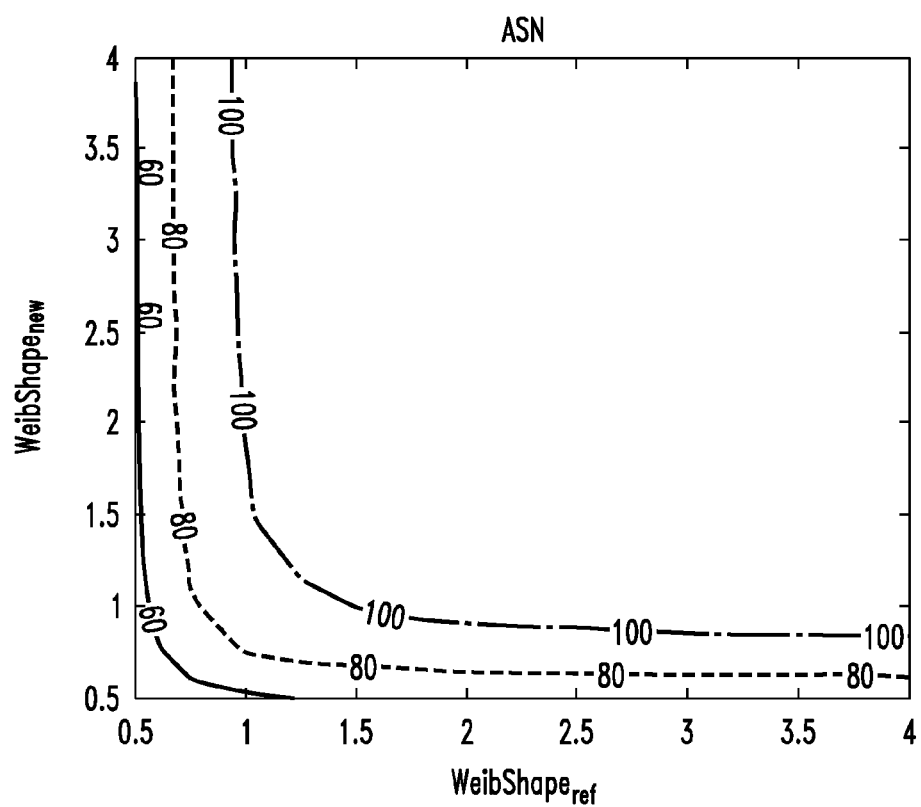
FIG. 4 shows a contour plot for a particular Average Sample Number (ASN) case with the same conditions as FIG. 3 according to an exemplary embodiment of the present disclosure.

Referring to the Weibull-distributed inputs; FIGS. 3-4 present exemplary test characteristics ($\alpha_{real}$, ASN($\Phi_0$)) for input with Weibull-distributed TBE and different shape factors. The nominal characteristics (e.g., those for exponential TBEs) are as follows:

$$\Phi_0=1, D=1.5, \alpha_{real}=0.10, \beta_{real}=0.10. \qquad (24)$$

These values are reached at WeibShape$_{new}$=WeibShape$_{ref}$=1. The behavior of $\beta_{real}$ is analogous to that of $\alpha_{real}$ in FIG. 3 (e.g., $\alpha_{real}$ of CSPRT vs. shape factors of Weibull-distributed TBEs of new and reference systems for the test with nominal characteristics).

FIGS. 3-4 indicate that deviations of the TBE distributions from the exponential have a strong effect on the test characteristics. At the same time, an increase of the shape factor above 1 (e.g., a situation of practical interest) makes for a substantially improved OC (higher $\alpha_{real}$, and $\beta_{real}$). A reduction below 1 in one of the shape factors, combined with an increase in the other above 1, does not cause deterioration of the OC versus the nominal. The test ASN is reduced by an increase above 1 in both factors and slightly increased by a reduction below 1, while the maximal test duration remains the same. Thus, practice-wise, the test can be suitable for most applications without the risk of the probability of a wrong decision exceeding the planned.

Figure 5:
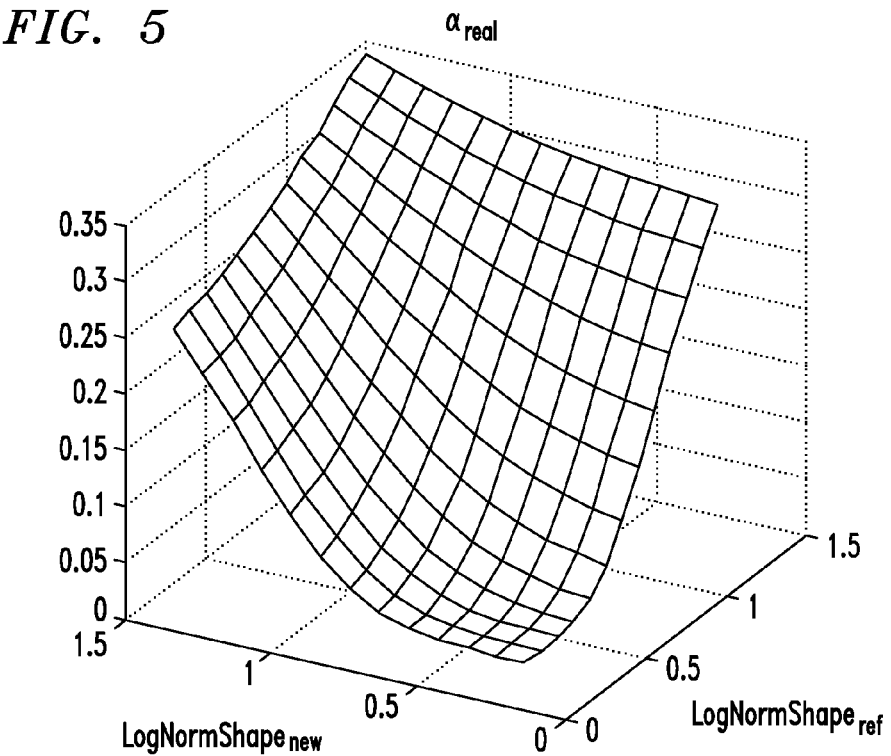
FIG. 5 shows characteristics of a test with TBEs being lognormal-distributed with different shape factors according to an exemplary embodiment of the present disclosure.

FIG. 5 presents a calculation example for the characteristics of the test above (e.g., $\alpha_{real}$ of CSPRT vs. shape factors of lognormal-distributed TBEs of new and reference systems for the test with nominal characteristics), but with the TBEs being lognormal-distributed with different shape factors, represented here by the standard deviation. Unlike the Weibull, the lognormal remains distinct from the exponential for all shape factors, and its hazard function is not monotonic. Even so the conclusions regarding the CSPRT robustness coincide completely with those of the Weibull case.

Turning to an evaluation of the robustness of the PCSPRT and FSST, note that for these tests simulation of the TBE is not needed. Indeed, the PCSPRT is memoryless by virtue of its design, and hence there is no need to simulate TBE. Its state space consists of pairs of integers, and transition probabilities are the same for each pair. This significantly simplifies robustness evaluation of the test. For the FSST we are able to provide a good approximation and a closed-form solution based on it. It can be observed that the $C_V$ of the TBE distributions is a factor of the test's robustness.

Figure 6:
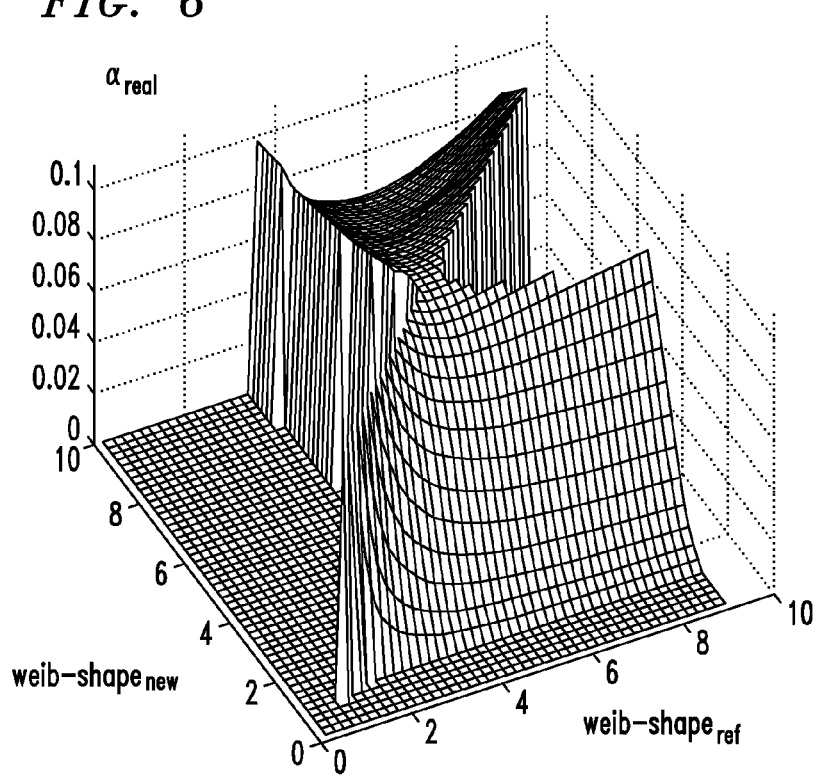
FIG. 6 shows characteristics of an exemplary sequential probability ratio test for a known distribution of TBEs and different shape factors according to an exemplary embodiment of the present disclosure.

Referring to a pairwise comparison SPRT (PCSPRT); FIG. 6 shows a calculation example for the characteristics of a PCSPRT ($\alpha_{real}$) at Weibull-distributed TBEs and different shape factors. The methodology is presented above. The test in question had the nominal characteristics (24). In the figure they are reached at WeibShape$_{new}$=WeibShape$_{ref}$=1.

Comparing the Fixed Sample Size Test (FSST) method; the methodology presented herein used parameters for an FSST with characteristics (24).

As per (19)-(20), it was obtained:

$$r=n=81, c=0.816 \quad (25)$$

Figure 7:
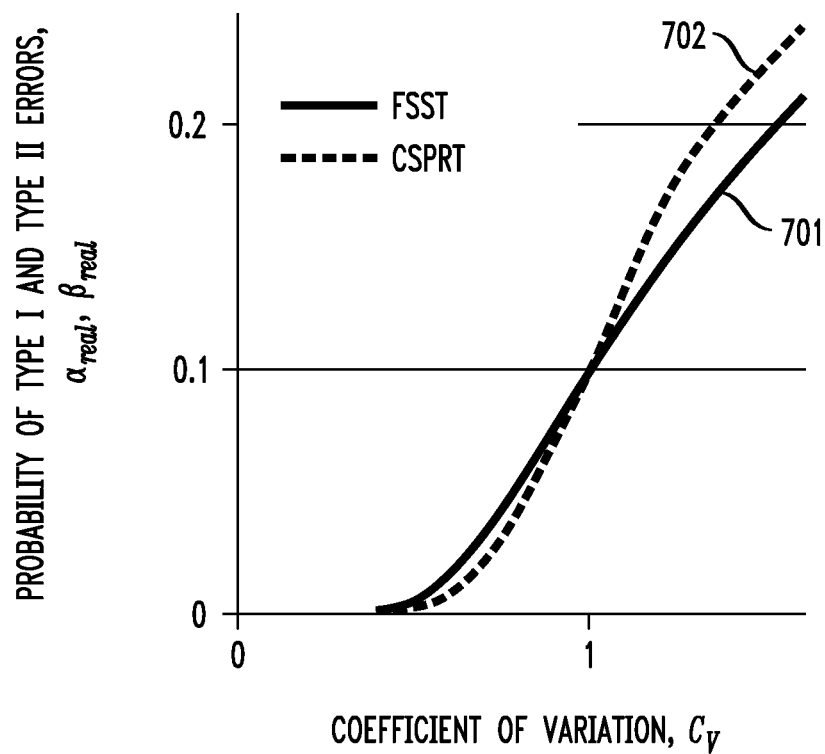
FIG. 7 shows results for error vs a coefficient of variation of input events, which is the same for both TBEs of a reference system and TBEs of a pilot system according to an exemplary embodiment of the present disclosure.

FIG. 7 presents the results for the relevant $\alpha_{real}$, $\beta_{real}$ vs $C_V$, which is the same for both $TBE_{ref}$ and $TBE_{new}$. Accordingly, it was found that $\alpha_{real}=\beta_{real}$ (FSST curve 701). It is seen that $\alpha_{real}$, and $\beta_{real}$ are less than (i.e. superior to) their nominal counterparts at $C_V<1$; in other words, under these conditions the FSST is robust.

FIG. 7 also contains the data for the CSPRT 702 with characteristics (24) and with Weibull-distributed TBEs. This test is described in detail above. It is seen that the tests are substantially equivalent in terms of robustness, but the ASN of the CSPRT 702 is substantially less than the SN of the FSST 701 (SN=r+n=162). Thus, the CSPRT is substantially shorter, on the average, than the FSST.

Figure 8:
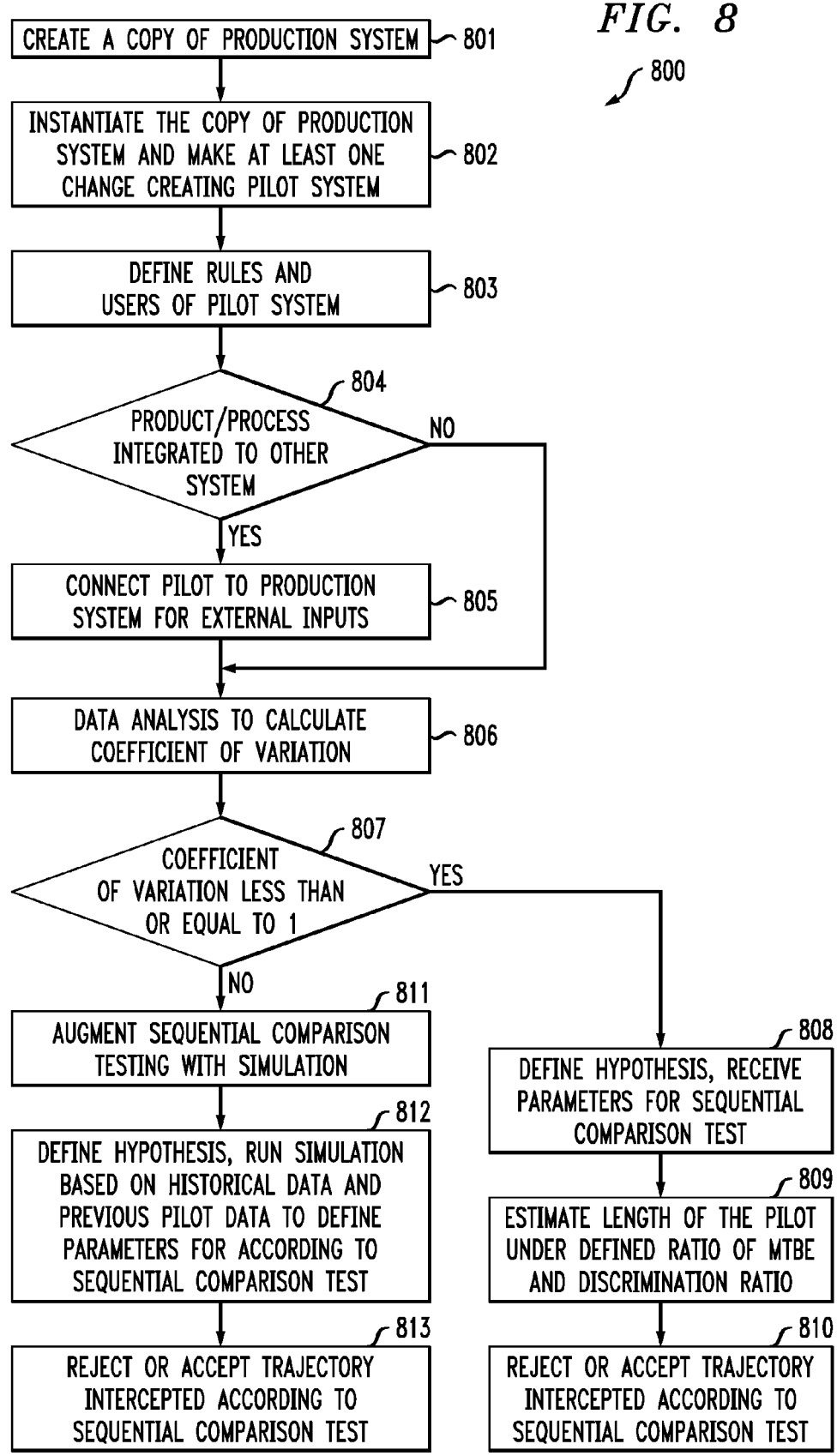
FIG. 8 is a flow chart of a method for conducting a pilot test, including a sequential probability ratio test, according to an exemplary embodiment of the present disclosure.

By way of review and referring to a method of piloting changes 800 in FIG. 8, a reference system configured to perform a task can be copied at 801 and the copy of the reference system instantiated at 802. Further, any changes to be piloted are made at 802 and rules of the pilot system defined at 803. The method includes determining whether the product or process of the reference system integrated into another system at 804 and if so, connecting the pilot to the reference system for receiving external inputs at 805. The reference system and the pilot system can be run in parallel at 806, wherein variations between the reference system output and the pilot system output are compared at 807. If a variation is detected (e.g., a coefficient of variation being calculated to be less than or equal to 1; e.g., a low coefficient of variation) then a hypothesis can be defined at 808 along with parameters for sequential comparison of the reference system and the pilot system. At block 809, a user can input a defined level of improvement and a discrimination ratio, e.g., d=1.25 and Φ0=1.3 (75% quantile with 30% improvement) or d=1.15 and Φ0=1.2 (85% quantile with 20% improvement). The comparison can be stopped once the hypothesis is accepted or rejected at 810 according to, for example, the decision state space of the pilot (see for example FIG. 2), wherein the method outputs a number of tests or service requests needed to achieve the user defined level of improvement (for example, 400 requests, 1,000 requests, etc.). In a case with the variation detected at 807 is greater than 1 (e.g., a high coefficient of variation), then a sequential comparison can be augmented with a simulation at 811, wherein a simulation is run based on available data to define the parameters for sequential comparison (see 812). The hypothesis can also be defined at 812. The pilot can be continued based on intermediate results determined using the simulation at 813, wherein the sequential comparison is performed.

It should be understood that the threshold of the coefficient of variation described above (e.g., 1) is exemplary and that one of ordinary skill in the art would understand that different values and methods for testing the hypothesis are possible.

Direct experimentation, or piloting, can help a business determine clearly how operational change performs in a production environment and its potential benefit. In manufacturing the traditional methods for measuring the benefit of a change are based on the supposition that the environment is relatively static, which is not the case for IT service providers. The use of the design of experiments according to an embodiment of the present disclosure can reduce or elimination trial and error methodology, which is often used in service delivery. Embodiments of the present disclosure can help in locating a problem and applying a solution while achieving cost avoidance. That is, within a design-development-production cycle a significant amount of effort and cost can be attributed to productization of an improvement.

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Furthermore, it should be noted that any of the methods described herein can include an additional step of providing a pilot system (see for example, FIG. 8, 801) comprising distinct software modules embodied on one or more tangible computer readable storage media. All the modules (or any subset thereof) can be on the same medium, or each can be on a different medium, for example. The modules can include any or all of the components shown in the figures. In a non-limiting example, the modules include a first module that calculated a coefficient of variation between a reference system and the pilot system (see for example, FIG. 8: 806), a second module that compares the coefficient of variation to a threshold (see for example, FIG. 8: 807); a third module that performs a sequential comparison of the reference system and the pilot system (see for example, FIG. 8: 808 or 812); and a fourth module that determines an end of the sequential comparison (see for example, FIG. 8: 810 or 813). Further, a computer program product can include a tangible computer-readable recordable storage medium with code adapted to be executed to carry out one or more method steps described herein, including the provision of the system with the distinct software modules.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 9:
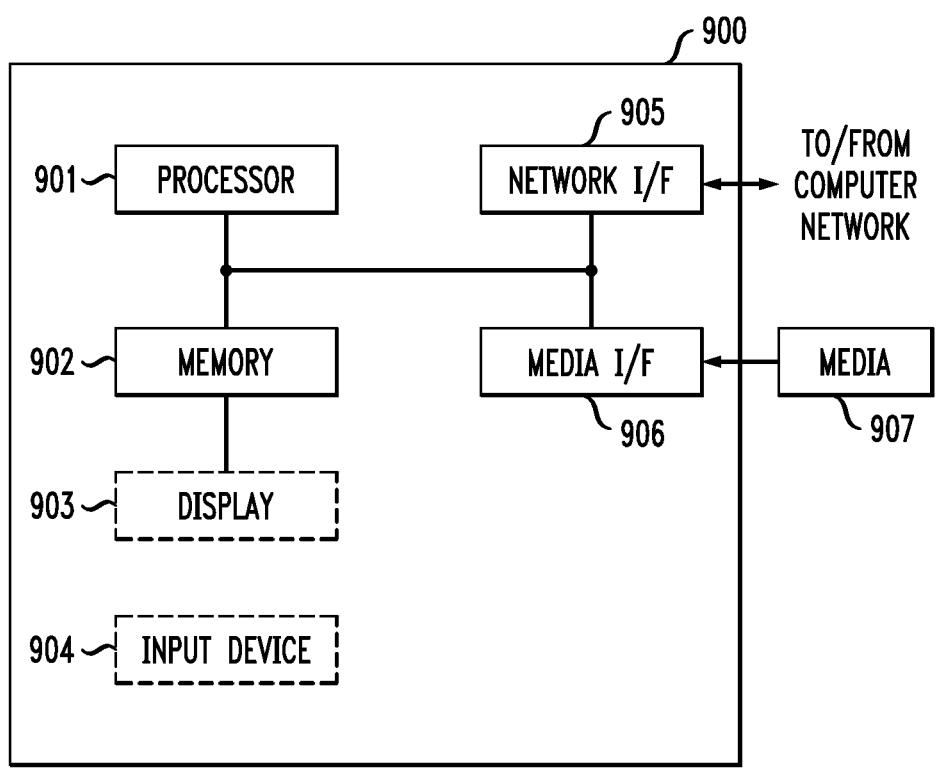
FIG. 9 is a diagram of a system configured to perform a sequential probability ratio test according to an exemplary embodiment of the present disclosure.

For example, FIG. 9 is a block diagram depicting an exemplary computer system for piloting changes in a process or system according to an embodiment of the present disclosure. The computer system shown in FIG. 90 includes a processor 901, memory 902, display 903, input device 904 (e.g., keyboard), a network interface (I/F) 905, a media IF 906, and media 907, such as a signal source, e.g., camera, Hard Drive (HD), external memory device, etc.

In different applications, some of the components shown in FIG. 9 can be omitted. The whole system shown in FIG. 9 is controlled by computer readable instructions, which are generally stored in the media 907. The software can be downloaded from a network (not shown in the figures), stored in the media 907. Alternatively, a software downloaded from a network can be loaded into the memory 902 and executed by the processor 901 so as to complete the function determined by the software.

The processor 901 may be configured to perform one or more methodologies described in the present disclosure, illustrative embodiments of which are shown in the above figures and described herein. Embodiments of the present disclosure can be implemented as a routine that is stored in memory 902 and executed by the processor 901 to process the signal from the media 1007. As such, the computer system is a general-purpose computer system that becomes a specific purpose computer system when executing the routine of the present disclosure.

Although the computer system described in FIG. 9 can support methods according to the present disclosure, this system is only one example of a computer system. Those skilled of the art should understand that other computer system designs can be used to implement the present invention.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A method for comparing systems comprising:
running, simultaneously, a first system and a second system, wherein the first system and the second system process events;
collecting first data from the first system based on the processing of the events;
collecting second data from the second system based on the processing of the events, wherein the second system includes at least one feature different than the first system;
performing a sequential probability ratio test based on the first data and the second data; and
determining a coefficient of variation of the events prior to performing the sequential probability ratio test, wherein the step of performing the sequential probability ratio test is performed upon a comparison of the coefficient of variation to a threshold.

2. The method of claim 1, wherein the threshold for performing the sequential probability ratio test is less than or equal to 1.

3. The method of claim 1, wherein the sequential probability ratio test is a comparison sequential probability ratio test.

4. The method of claim 3, wherein the comparison sequential probability ratio test verifies a hypothesis about a ratio of mean time between events for the first system and the second system.

5. The method of claim 1, wherein the sequential probability ratio test is a fixed sample size test.

6. The method of claim 1, wherein the sequential probability ratio test is a pairwise comparison sequential probability ratio test.

7. The method of claim 1, further comprising incorporating simulation data into the sequential probability ratio test.

8. The method of claim 1, wherein the sequential probability ratio test comprises detecting events in the first data and the second data, and comparing a time between events of the first data to a time between events of the second data in making a decision to accept or reject the at least one feature different than the first system.

9. A method for comparing systems comprising:
running, simultaneously, a first system and a second system, wherein the first system and the second system process events;
collecting first data from the first system based on the processing of the events;
collecting second data from the second system based on the processing of the events, wherein the second system includes at least one feature different than the first system;
performing a sequential probability ratio test based on the first data and the second data;
determining a coefficient of variation of the events prior to performing the sequential probability ratio test; and
incorporating simulation data into the sequential probability ratio test upon a comparison of the coefficient of variation to a threshold.

10. The method of claim 9, wherein the sequential probability ratio test is a comparison sequential probability ratio test.

11. The method of claim 10, wherein the comparison sequential probability ratio test verifies a hypothesis about a ratio of mean time between events for the first system and the second system.

12. The method of claim 9, wherein the sequential probability ratio test is a fixed sample size test.

13. The method of claim 9, wherein the sequential probability ratio test is a pairwise comparison sequential probability ratio test.

14. The method of claim 9, wherein the threshold for incorporating simulation data into the sequential probability ratio test is greater than 1.

15. The method of claim 9, wherein the sequential probability ratio test comprises detecting events in the first data and the second data, and comparing a time between events of the first data to a time between events of the second data in making a decision to accept or reject the at least one feature different than the first system.

\* \* \* \* \*